US010302410B2

(12) United States Patent
Fernihough et al.

(10) Patent No.: US 10,302,410 B2
(45) Date of Patent: *May 28, 2019

(54) PRESSURE-BALANCED SEISMIC SENSOR PACKAGE

(71) Applicant: Geospace Technologies Corporation, Houston, TX (US)

(72) Inventors: Robert Alexis Peregrin Fernihough, Austin, TX (US); Brian Anthony Hare, Austin, TX (US)

(73) Assignee: Geospace Technologies Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/921,834

(22) Filed: Mar. 15, 2018

(65) Prior Publication Data

US 2018/0202795 A1    Jul. 19, 2018

Related U.S. Application Data

(63) Continuation of application No. 14/821,044, filed on Aug. 7, 2015, now Pat. No. 9,927,221.

(Continued)

(51) Int. Cl.
*G01V 1/18* (2006.01)
*G01B 9/02* (2006.01)
(Continued)

(52) U.S. Cl.
CPC ......... *G01B 9/02027* (2013.01); *G01H 9/004* (2013.01); *G01P 15/093* (2013.01);
(Continued)

(58) Field of Classification Search
None
See application file for complete search history.

(56) References Cited

U.S. PATENT DOCUMENTS 3,668,603 A * 6/1972 Burgess ............... F21S 43/195
 439/101
4,367,967 A   1/1983 Albert, Jr.
(Continued)

FOREIGN PATENT DOCUMENTS

| EP | 1821107 | 8/2007 |
| GB | 2386687 | 9/2003 |
| GB | 2437839 | 11/2007 |

OTHER PUBLICATIONS

Arkema Innovative Chemistry, "Paints and coatings / Delivering Innovative Products and Services to Coatings Formulators Worldwide," Arkema Innovative Chemistry, www.arkema.com, 12 pgs, [retrieved on Jul. 18, 2014 from the Internet <URL: http://www.arkema.com/export/shared/.content/media/downloads/products-documentations/coatings/arkema-global-coatings-offer-2014.pdf>].

(Continued)

*Primary Examiner* — Hovhannes Baghdasaryan
(74) *Attorney, Agent, or Firm* — Blank Rome LLP

(57) ABSTRACT

Apparatus, systems and methods associated with a pressure-balanced seismic sensor package are disclosed. One example of an apparatus can include a plurality of optical components, a sensor box enclosing the plurality of optical components, and a lid for the sensor box. The plurality of optical components, the sensor box, and the lid form a pressure-balanced seismic sensor package.

23 Claims, 8 Drawing Sheets

Related U.S. Application Data

(60) Provisional application No. 62/059,565, filed on Oct. 3, 2014.

(51) Int. Cl.
  *G01P 15/093* (2006.01)
  *G01H 9/00* (2006.01)
  *G01V 13/00* (2006.01)
  *G01P 15/18* (2013.01)

(52) U.S. Cl.
  CPC ............... *G01P 15/18* (2013.01); *G01V 1/18* (2013.01); *G01V 13/00* (2013.01)

(56) References Cited

U.S. PATENT DOCUMENTS

| | | | |
|---|---|---|---|
| 4,422,167 A | | 12/1983 | Shajenko |
| 4,578,088 A | * | 3/1986 | Linscheid ............... B03C 3/70 174/142 |
| 5,373,487 A | | 12/1994 | Crawford et al. |
| 6,314,056 B1 | | 11/2001 | Bunn et al. |
| 6,606,186 B2 | | 8/2003 | Maas |
| 7,167,412 B2 | | 1/2007 | Tenghamn |
| 7,221,282 B1 | | 5/2007 | Ross et al. |
| 7,222,534 B2 | | 5/2007 | Maas et al. |
| 7,447,113 B2 | | 11/2008 | Martinez et al. |
| 7,671,598 B2 | | 3/2010 | Ronaess et al. |
| 8,424,847 B2 | | 4/2013 | Scott |
| 8,611,180 B2 | | 12/2013 | Berg et al. |
| 8,645,071 B2 | | 2/2014 | Fernihough |
| 2003/0011878 A1 | | 1/2003 | Maas et al. |
| 2003/0020919 A1 | * | 1/2003 | Tweedy ............... G01H 9/004 356/477 |
| 2003/0067841 A1 | | 4/2003 | Amaral et al. |
| 2005/0128731 A1 | | 6/2005 | Hui |
| 2006/0227656 A1 | | 10/2006 | Berg et al. |
| 2007/0258319 A1 | | 11/2007 | Ronnekleiv et al. |
| 2007/0258330 A1 | | 11/2007 | Berg et al. |
| 2010/0226203 A1 | | 9/2010 | Buttle et al. |
| 2012/0250457 A1 | | 10/2012 | Rickert et al. |
| 2013/0028051 A1 | | 1/2013 | Barkved et al. |
| 2013/0188449 A1 | | 7/2013 | Brizard |
| 2014/0046599 A1 | | 2/2014 | Smith |
| 2014/0112094 A1 | | 4/2014 | Fernihough |
| 2014/0160885 A1 | | 6/2014 | Tenghamn |
| 2014/0185409 A1 | | 7/2014 | Voldsbekk |
| 2014/0185410 A1 | | 7/2014 | Voldsbekk |
| 2014/0185411 A1 | | 7/2014 | Voldsbekk |
| 2014/0185412 A1 | | 7/2014 | Voldsbekk |
| 2014/0238773 A1 | | 8/2014 | Sallas et al. |
| 2014/0254310 A1 | | 9/2014 | Voldsbekk |
| 2015/0219776 A1 | | 8/2015 | Fernihough |

OTHER PUBLICATIONS

DuPont—Hytrel HTR8351 NC021 (Preliminary Data), "Thermoplastic Polyester Elastomer", DuPont, www.dupont.com, Revised Oct. 8, 2013, 2 pgs., [retrieved on Jul. 18, 2014 from the Internet <URL: http://dupont.materialdatacenter.com/profiler/material/pdf/datasheet/HytrelHTR8351NC021>].

Crompton Corp., "Polymer Modifiers—Polybond 3200 Chemically Modified Polyolefin," Crompton—Olefins & Styrenics, www.cromptoncorp.com, Revised Oct. 5, 2004, 2 pgs.

Crompton Corp., "Polymer Modifiers—Polybond 3000 Chemically Modified Polyolefin," Crompton—Olefins & Styrenics, www.cromptoncorp.com, Revised Oct. 5, 2004.

U.S. Appl. No. 14/452,211, filed Aug. 5, 2014, Titled: "Subsea Cable Having Floodable Optical Fiber Conduit" (16 pgs).

Extended European Search Report for related EP Application EP 15187661.2, dated Oct. 6, 2016 (11 pgs).

* cited by examiner

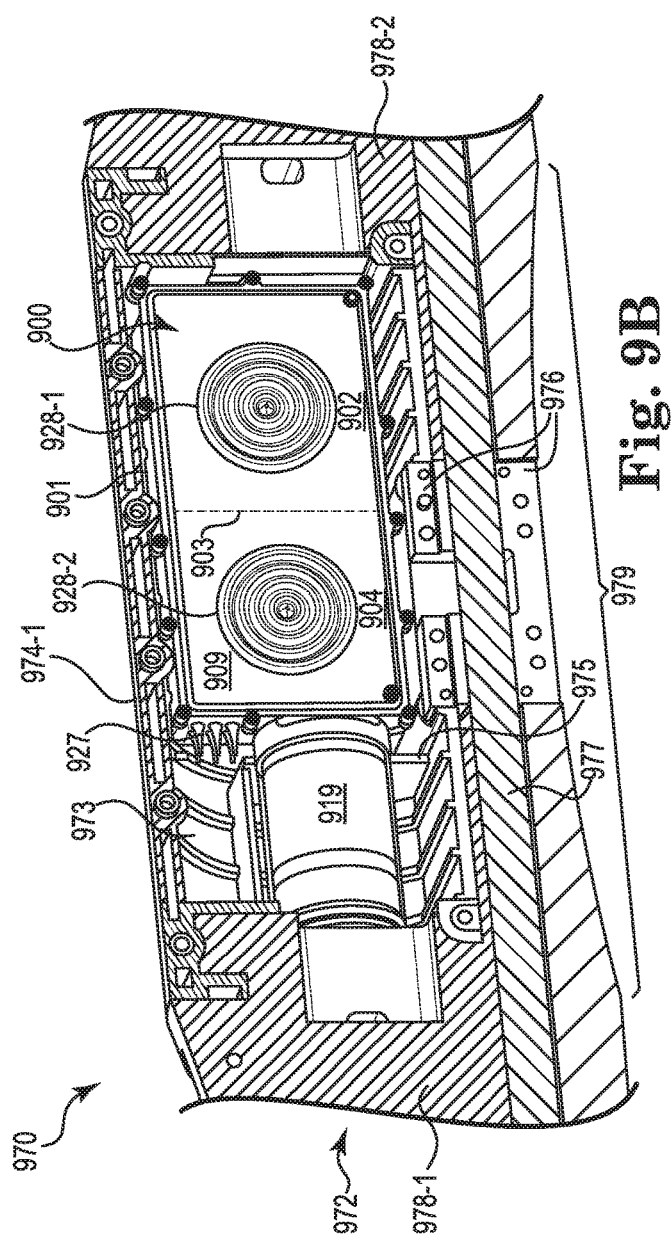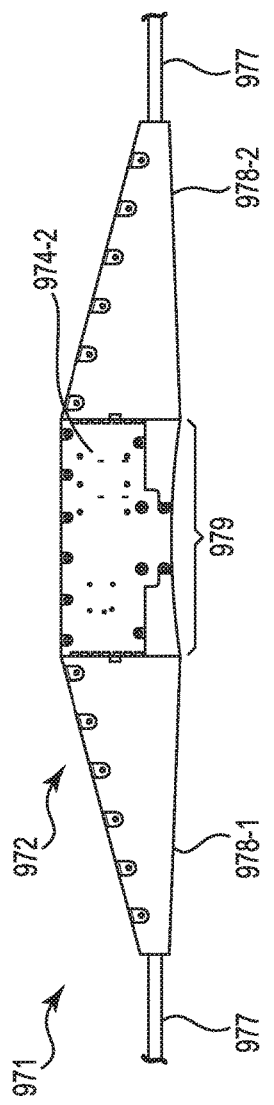
Fig. 9B
Fig. 9A

PRESSURE-BALANCED SEISMIC SENSOR PACKAGE

CROSS-REFERENCE TO RELATED APPLICATIONS

This application claims priority to U.S. Non-Provisional application Ser. No. 14/821,044 filed Aug. 7, 2015, which claims priority to U.S. Provisional Application No. 62/059,565, filed Oct. 3, 2014, both of which are incorporated by reference.

BACKGROUND

Seismic sensors can be utilized to sense parameters of seismic energy such as acceleration, motion and/or pressure, among others. The seismic energy may be naturally occurring or may be imparted by a seismic source for the purpose of performing seismic surveys, for instance, in an underwater environment.

Permanent (hydrocarbon) reservoir monitoring (PRM) is a technique where multiple three-dimensional seismic "pictures" of the state of a hydrocarbon reservoir are taken such that a geologist or reservoir engineer may plan the location of additional boreholes for increasing the efficiency of the hydrocarbon extraction and/or may assess the efficiency of the current extraction techniques over time. In some cases, taking multiple seismic pictures of a hydrocarbon reservoir may be referred to as four-dimensional (4D) seismic.

Marine-based PRM faces significant challenges that are not faced by land-based reservoir monitoring systems. This is particularly true of ocean bottom installations as water depths extend into the 1000 meter range and beyond.

Some seismic sensor package designs appropriate for PRM may include manufacturing techniques that rely on structural rigidity, strong adhesives, encapsulants, and pressurization, etc., to provide a water-tight enclosure for the seismic sensors in order to protect the seismic sensors from exposure to water and/or to withstand high pressure in deep water. It may be difficult to service the seismic sensor package in such cases. As such, a small difficulty with one component of such a seismic sensor package may result in disposal of the whole specialized and/or expensive seismic sensor package.

BRIEF DESCRIPTION OF THE DRAWINGS

FIG. 9A illustrates a planar view of an example of a sensor station in which a pressure-balanced seismic sensor package is deployable according to one or more embodiments of the present disclosure.

FIG. 9B illustrates an enlarged cross-section view of a middle portion of the example sensor station from FIG. 9A in which a pressure-balanced seismic sensor package is deployable according to one or more embodiments of the present disclosure.

DETAILED DESCRIPTION

Figure 1:
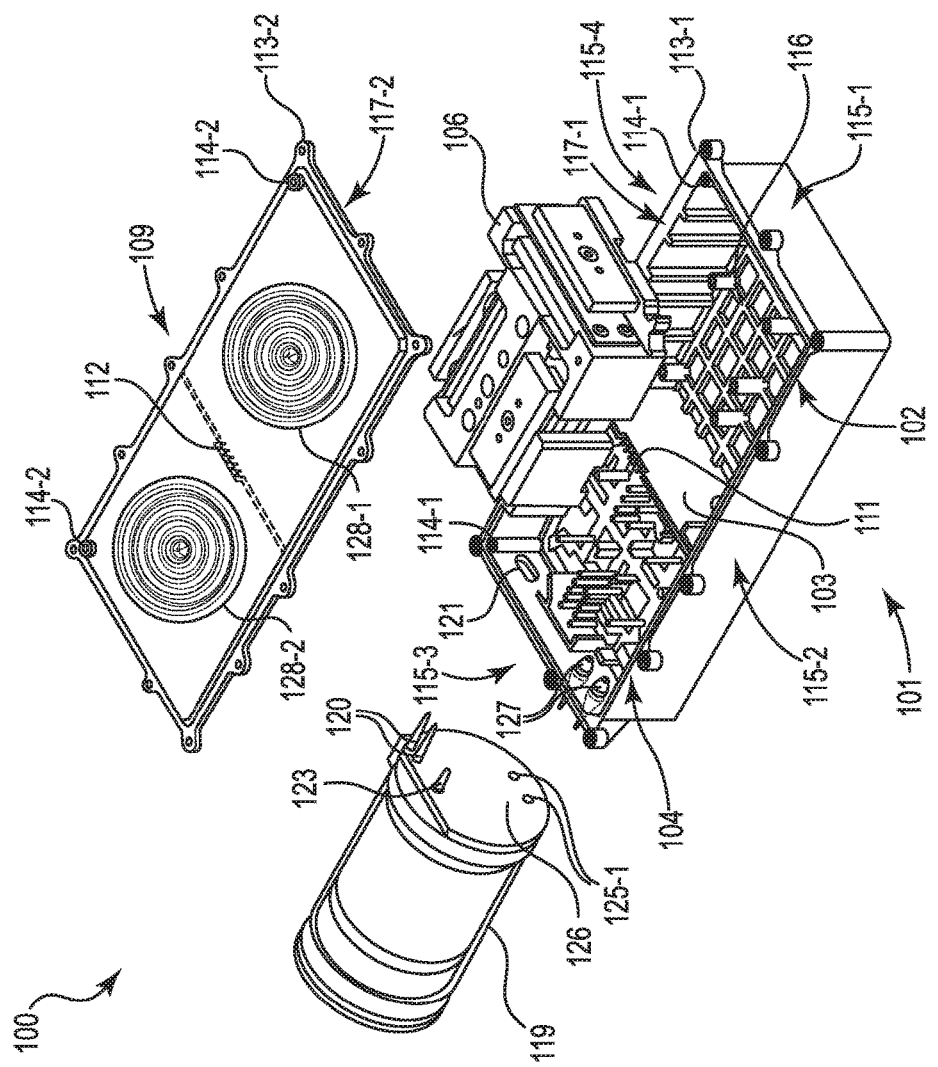
FIG. 1 illustrates an exploded view of an example of a portion of a pressure-balanced seismic sensor package according to one or more embodiments of the present disclosure.

This disclosure is related generally to the field of marine seismic surveying and/or monitoring. For example, this disclosure may have applications in marine seismic surveying and/or monitoring in which one or more seismic sources may be used to generate wavefields that interact with subsurface formations, and seismic sensors at or near the seafloor receive seismic energy generated by the seismic sources, or naturally occurring seismic events, and affected by the interaction with the subsurface formation. For the sake of brevity, terms such as seismic sources, seismic events, seismic sensors, and seismic and/or geophysical data, etc., are used herein. However, such terms are intended to be inclusive of sources, events, sensors, data, etc., involved in sound navigation and ranging (sonar), where appropriate. "Seafloor" and "ocean bottom", as used herein, refer to a floor of a body of water, such as an ocean, a sea, or a lake, for example, whereas "subsea" refers to being under the surface of the body of water, possibly at or near the floor. The body of water can be a salt-water body of water, a fresh-water body of water, or a brackish body of water.

The present disclosure describes a pressure-balanced seismic sensor package. As used herein, the term "pressure-balanced" is intended to mean that a substantially similar amount of pressure is provided outward from an interior of the package toward an exterior (also referred to as internal pressure) as an amount of pressure that exists inward from an exterior of the package toward an interior (also referred to as exterior pressure). As defined above and used herein, the term "pressure-balanced" is intended to be differentiable from the term "pressure-tolerant". The term pressure-tolerant, as used herein, is intended to refer to a component's capability to function in its intended manner and withstand increased pressure from an exterior or external environment and to reduce the likelihood of increased pressure leading to damage of the components. As used herein, "substantially similar" when used to compare two measurable values indicates that the second measurable value is within 90% to 110% of the first measurable value.

Also in the present disclosure, the term "optical components" is used and intended to include optical components such as an optical interferometer device (also referred to as interferometer optics), an optical accelerometer, a three axis optical accelerometer, an optical splice shuttle, and an optical hydrophone, among other possible optical components. The term "components" may also be used alone and is intended to also include such mechanical components as gaskets, seal screw fittings, boot seals, a sensor box, etc., in addition to including optical components. As used herein, it is noted that the term "apparatus" is intended to be inclusive of optical components, optical cables, sensor stations, housings, devices and/or components to a system are described. Each may be referred separately as an "apparatus". The term "system" as used herein is intended to mean one or more apparatus coupled together to achieve a particular function.

"Pressure-tolerant" optical components and "Pressure-tolerant" apparatus such as those mentioned above are intended to function and withstand increased pressure from an exterior environmental force. For example, the pressure-tolerant optical components and/or other components in the present disclosure may be constructed and intended to function and withstand increased, exterior environmental pressures at operating depths in a marine environment of between 500 meters and 1500 meters or more without damage or with limited reduction in the apparatuses function and intended use.

As used herein, a pressure-balanced seismic sensor package is intended to mean an assembly of a plurality of optical components together with a sensor box. In at least one embodiment the sensor box of the present disclosure can include a first compartment and a second compartment to ease access and serviceability of the assembly. The plurality of optical components may be connected and arranged in an interior of the sensor box (referred to herein as a first part of the seismic sensor package) and may be connected and arranged in relation to components connected to an exterior of the sensor box (referred to herein as a second part of the seismic sensor package). For example, the optical hydrophone may be connected to an exterior of the sensor box (second part of the pressure-balanced seismic sensor package) and the three axis optical accelerometer may be connected to an interior of the sensor box (first part of the pressure-balanced seismic sensor package). The term "sensor box", as used in the present disclosure is intended to mean a housing to secure and possibly compartmentalize or arrange the connection of the plurality of optical components.

Previously, a marine environment housing to enclose or assemble components would have been purposefully constructed to provide a water-tight enclosure for components in order to protect the components from exposure to water and/or to withstand high pressure in deep water.

In contrast, a sensor box according to embodiments described herein is provided to be pressure-balanced and pressure-tolerant relative to a floodable housing in which it is enclosed, such as a floodable sensor station, while remaining easily accessible and serviceable. The pressure-balanced sensor box may have a lid coupled thereto, such that the sensor box and lid enclose an interior, thereby housing one or more of the plurality of optical components. As used herein, "enclose" refers to defining a boundary surface encompassing a volume. As used herein, a structure that encloses may partially or fully cover the boundary surface. In some embodiments, a structure that encloses may provide a supportive framework for apparatus within the volume. In at least one embodiment, the lid is a removable lid, contributing to an ability to access and service the plurality of optical components. The lid may be constructed to contribute to pressure-balanced and pressure-tolerant properties of the pressure-balanced seismic sensor package and sensor box. In at least one embodiment, the lid for the sensor box is provided with at least one flexible component. As used herein, a flexible component is formed to contribute to the pressure-balance of the pressure-balanced seismic sensor package and/or sensor box. In at least some embodiments, a flexible component is provided in association with each compartment of a sensor box, e.g., the first compartment and second compartment. As will be described in more detail below, the flexible component is constructed in such a manner as to allow an alteration of a shape of the flexible component in response to a change in an external pressure. The pressure-balanced sensor box and/or pressure-balanced seismic sensor package and pressure-tolerate components may still be constructed and designed to preclude liquid from a surrounding environment, such as seawater, from penetrating unless the component is expressly stated to be floodable as defined below. However, the features disclosed herein for the pressure-balanced seismic sensor package and/or pressure-balanced sensor box may reduce or eliminate the need to construct components in as rigid a watertight manner or from such rugged and potentially more costly materials as may be needed to be pressure-tolerant at the increased exterior, marine environmental pressures at operating depths of between 500 meters and 1500 meters or more.

According to embodiments, the pressure-balance of the disclosed seismic sensor package is achieved at least in part by at least partially filling the interior of the sensor box, or the free space therein, with a fluid, such as a mineral oil or a thermally-reversible thermoplastic gel, to purposefully achieve the substantially similar pressure balance in cooperation with the flexible component to the lid.

The pressure-balanced seismic sensor package, according to embodiments, may be further housed within a sensor station. As used herein, a sensor station is intended to mean a housing to enclose a seismic sensor package, such as the pressure-balanced seismic sensor package described herein. The sensor station connects lengths of optical cables to the plurality of optical components of the pressure-balanced seismic sensor package using fiber trunk lines and/or separate optical fibers within an internal cavity to the sensor station.

In some embodiments, the sensor station enclosing the pressure-balanced seismic sensor package is constructed to be "floodable". The floodable construction of the sensor station additionally adds to the pressure-balanced capability of the sensor station itself and may reduce the cost and materials used to construct the sensor station. And, as used herein, "floodable" is intended to mean an apparatus which is designed to passively or actively allow a liquid in the surrounding environment, such as a marine environment, to penetrate to an interior of the apparatus and contact the contents of the interior thereto. In at least one embodiment, the sensor box may not be designed to be actively floodable but the sensor station may be designed to be actively floodable. Thus, in at least one embodiment, the sensor station is floodable to allow seawater to contact the pressure-balanced, pressure-tolerant sensor box having the plurality of optical components, lid, and flexible component.

Other applications for the embodiments described herein may include land environments and electromagnetic surveying and monitoring applications. That is, the scope of the features and embodiments described herein may have application where a pressure-balanced package is useful as a containment and/or arrangement package where it is desirable to have a balance between an internal pressure and the external pressure.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents, unless the context clearly dictates otherwise, as do "a number of", "at least one", and "one or more". Furthermore, the words "can" and "may" are used throughout this application in a permissive sense (i.e., having the potential to, being able to), not in a mandatory sense (i.e., must). The term "include," and derivations thereof, means "including, but not limited to". The terms "coupled" and "coupling" means to be directly or indirectly connected physically or in signal transmission, as appropriate to the context. Terms relating special orientation (e.g., upper, lower, right, left, etc.) are used herein to describe the illustrated embodiments, rather than to fix the orientation of the invention as constructed or operated.

The figures herein follow a numbering convention in which the first digit or digits correspond to the figure number and the remaining digits identify an element or component in the figure. Similar elements or components between different figures may be identified by the use of similar digits. For example, 108 may reference element "08" in FIG. 1, and a similar element may be referenced as 208 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present disclosure and should not be taken in a limiting sense.

FIG. 1 illustrates an exploded view of an example of a portion of a pressure-balanced seismic sensor package 100 according to one or more embodiments of the present disclosure. In contrast to other seismic sensor package designs, embodiments of the pressure-balanced seismic sensor package 100 in accordance with the present disclosure can be readily serviceable, modular, pressure-tolerant, and/or pressure-balanced for use in direct contact with water up to large operating depths, for example between 500 meters and 1500 meters or more.

In various embodiments consistent with the present disclosure, the pressure-balanced seismic sensor package 100 can include a sensor box 101 having a first compartment 102 separated by a dividing wall 103 from a second compartment 104. Exterior walls 115-1, 115-2, 115-3 and 115-4 to the sensor box 101 form a perimeter to the sensor box 101, providing, as illustrated, three sides of first compartment 102 and three sides of second compartment 104. Floor 116 provides a lower boundary of the first compartment 102 and the second compartment 104. Although the walls 115-1, 115-2, 115-3 and 115-4 of the sensor box 101 are shown to be rectangular with four sides, embodiments are not so limited. For example, first compartment 102 could have a triangular cross-section, whereby walls 115-1 and 115-2 would provide two sides of the triangle, and dividing wall 103 would provide the third side. Persons of ordinary skill in the art can identify various cross-sectional shapes of sensor box 101 that would be suitable for various operations.

As shown in FIG. 1, the walls 115-1, 115-2, 115-3 and 115-4 can, in various embodiments, be configured with support structures, such as ribs, to impart rigidity and/or for stable attachment of the dividing wall 103. As shown in FIG. 1, the floor 116 also can, in various embodiments, be configured with support structures to impart rigidity, for stable attachment of the dividing wall 103, and/or for support and/or attachment of optical components, as described herein. In various embodiments, the support and/or attachment of the optical components can be enabled with bosses and/or screw or bolt fittings, among other possibilities. The sensor box 101 and/or the dividing wall 103 can be formed by, in some embodiments, injection molding using a rigid plastic material that is stable in water. For example, the rigid plastic material can be Ultem® 2300, which includes an extruded 30% glass-reinforced polyetherimide, although embodiments are not so limited.

In some embodiments, the first compartment 102 can be configured to enclose, and support at least an optical accelerometer 106, which in some embodiments can be a three-axis optical accelerometer, such as an orthogonal array of three optical accelerometers. The second compartment 104 can be configured to enclose, and support, at least interferometer optics and an optical splice shuttle, as described with regard to FIG. 5 at 552 and 554, respectively.

Hence, the present disclosure describes a plurality of optical components, such as the optical accelerometer 106, the interferometer optics 552, and the optical splice shuttle 554. The sensor box 101 encloses the plurality of optical components. As described herein, the optical accelerometer 106, the interferometer optics 552, the optical splice shuttle 554, and/or the sensor box 101 can be configured to be pressure-tolerant. In at least one embodiment, the sensor box 101 can, as described herein, be configured to be pressure-balanced, for example, when subjected to an external pressure of water. In at least one embodiment, the sensor box 101 can be configured to be pressure-balanced in response to and through a change in an external pressure of water. For example, the change in the external pressure of water may be in response to a progressive change in water pressure caused by changes in depth and/or seismic events, among other causes.

The interior surface of the walls 115-1, 115-2, 115-3 and 115-4 of the sensor box 101 can have insertion pathway(s) 114-1 formed thereon. The insertion pathway(s) 114-1 may have a hollow core and an opening, such as near the bottom, through which fluidic materials, as described herein, can be inserted into the first compartment 102 and the second compartment 104. In some embodiments, the insertion pathway(s) 114-1 can be formed in corners of the sensor box 101, although embodiments are not so limited. In the example embodiment illustrated in FIG. 1 an insertion pathway 114-1 is shown at a corner between walls 115-1 and 115-4 and an insertion pathway 114-1 is shown at a corner between walls 115-3 and 115-4.

The walls 115-1, 115-2, 115-3 and 115-4 of the sensor box 101 can each have an upper surface 117-1 formed to include screw fastener fittings 113-1 to enable attachment of a lid 109 to a top of the sensor box 101. In some embodiments, the screw fastener fittings 113-1 can be formed along an exterior of the upper surface 117-1 distal from the interior surface of the walls 115-1, 115-2, 115-3 and 115-4 of the sensor box 101. In some embodiments, the screw fastener fittings 113-1 can be formed at corners of the sensor box 101 and/or at various positions between the corners, although embodiments are not so limited. The dividing wall 103 can, in various embodiments, include a first tongue-and-groove arrangement 111 on an upper edge of the dividing wall 103.

The lid 109 can be formed to attach to the top of the sensor box 101 such that the lid 109 provides a pressure-tolerant seal in deep water, such as for permanent reservoir monitoring (PRM) at 500-1500 meters or more. To contribute to such attachment, the lid 109 can be formed to include a lower surface 117-2 to match with the upper surface 117-1 of the wall 115 of the sensor box 101. The lid 109 can include screw fastener fittings 113-2 formed to match with the screw fastener fittings 113-1. The lid 109 also can include seal screw fittings 114-2 formed to match with the insertion pathways 114-1 of the sensor box 101.

The lid 109 also can be configured to include a second tongue-and-groove arrangement 112 on lower surface 117-2 configured to match with the first tongue-and-groove arrangement 111 on the upper edge of the dividing wall 103 when the lid 109 is attached to the sensor box 101. As described further herein, a matched tongue-and-groove arrangement 111, 112 can be configured to provide openings through which optical fibers, as shown with regard to FIG. 2, can pass between the first compartment 102 and the second compartment 104. The optical fibers can output optical signals, which can contain seismic data, from the optical accelerometer 106. The optical fibers can pass through the matched tongue-and-groove-arrangement 111, 112 to connect with the optical splice shuttle 554. The matched tongue-and-groove-arrangement 111, 112 can otherwise be sealed between the first compartment 102 and the second compartment 104.

As described further herein, the lid 109 can, in various embodiments, include at least one flexible component, such as flexible components 128-1, 128-2, formed to contribute to a pressure-balance of the sensor box 101 by an alteration of a shape of the flexible components 128-1, 128-2 in response to a change in an external pressure. That is, each flexible component can, in some embodiments, undergo a progressive alteration of its shape, such as progressively flexing, in response to a progressive change in water pressure caused by changes in depth and/or seismic events, among other causes. In some embodiments, an entirety of the lid 109 can be a single flexible component 128. Such a lid may function as a single flexible component, for example, by being formed in a thin planar configuration, in contrast to a circular ridged configuration shown for each of the flexible components 128-1, 128-2 in FIG. 1. As such, the lid 109 and/or the flexible components 128-1, 128-2 can be formed from, in some embodiments, a flexible plastic material that is stable in water. For example, the flexible plastic material can be Ultem® 1000, which is an unreinforced polyetherimide, although embodiments are not so limited.

As such, the pressure-balanced seismic sensor package 100 described herein can have a first part of the pressure-balanced seismic sensor package 100 that can include a plurality of optical components, such as the optical accelerometer 106, interferometer optics 552, and optical splice shuttle 554, enclosed by the sensor box 101.

In addition, the pressure-balanced seismic sensor package 100 described herein can have a second part that can include an optical hydrophone 119 mechanically connected, at least partially, to an exterior of a wall 115-3 of the sensor box 101 (for example, to the exterior of wall 115-3 that is opposite of dividing wall 103 and forms a perimeter of second compartment 104). An end wall 126 of the optical hydrophone 119 can be configured to at least partially abut a portion of the wall 115-3 that encloses the second compartment 104 when optical hydrophone 119 is mechanically connected to the sensor box 101. FIG. 1 shows the end wall 126 of the optical hydrophone 119 before mechanical connection to an end wall at a longitudinal end of the sensor box 101, although embodiments are not so limited. The optical hydrophone 119 can be mechanically connected to a side wall at the longitudinal end that encloses the second compartment 104, and/or the sensor box 101 can be configured in various shapes and sizes that could affect a connection position of the optical hydrophone 119. The optical hydrophone 119 can, in various embodiments, be configured to be longitudinally cylindrical or any other suitable shape.

As described herein, the optical hydrophone 119 can, in various embodiments, be configured to be pressure-tolerant and/or pressure-balanced. For example, the optical hydrophone 119 may be configured to be pressure-tolerant and/or pressure-balanced by having various types of seals, oil reservoirs, relief valves, etc., included in a structure of the optical hydrophone 119.

The first part of the pressure-balanced seismic sensor package 100 and the second part of the pressure-balanced seismic sensor package 100 can both be "electrically passive". Being electrically passive, as used herein, can indicate that components of the pressure-balanced seismic sensor package 100 can operate without active input of electricity. In various embodiments, such electrical passivity can be achieved through use of passive electrical components, such as resistors, inductors, capacitors, transformers, etc., that do not require active input of electricity and/or by transmitting optical signals via optical fibers, as described further herein. For example, the term "optical hydrophone" is used herein to denote the optical hydrophone 119 described herein as at least having an optical interface 120 using optical fibers to output optical signals from and/or input optical signals to the optical hydrophone 119, although the optical hydrophone 119 can be configured with other optical components to contribute to the electrically passive operation of the optical hydrophone 119. The optical fibers of the optical interface 120 can transit through a port 121 in the wall 115 of the sensor box 101 to be connected to an optical splice shuttle 554 in the second compartment 104, as described further herein.

The mechanical connection of the optical hydrophone 119 to the sensor box 101 can, in some embodiments, include a threaded post 123 on the end wall 126 that, in various embodiments, may only partially penetrate the wall 115-3 of the sensor box 101 by being screwed into a threaded fitting (not shown) in the wall 115-3, or that may penetrate the wall 115-3 so as to be mechanically connected by a nut (not shown) screwed onto the threaded post 123. The mechanical connection of the optical hydrophone 119 to the sensor box 101 can, in some embodiments, further include screw fastener fittings 125-1 in the end wall 126 for use with screw fasteners, as described further herein. The mechanical connection of the optical hydrophone 119 to the sensor box 101 just described can, in some embodiments, be supplemented with gasket material to form a pressure-tolerant seal for deep water deployment. The gasket material can include a sealing compound, such as marine grade silicon, although embodiments are not so limited.

In various embodiments, flexible boot seals 127 for optical fibers, as described further herein, can transit through the wall 115 from the interior to the exterior of the sensor box 101. Each flexible boot seal 127 can be configured to provide a pressure-tolerant seal for passage of an optical fiber (not shown) therethrough. As such, the optical fibers can be configured to output optical signals from and/or input optical signals to the pressure-balanced seismic sensor package 100. These optical signals can carry various types of data, including seismic data. The optical signals transmitted by the optical fibers can, in various embodiments, be directly or indirectly transferred to an optical cable 977, as described further with regard to FIGS. 9A and 9B, for downstream processing of the seismic data. Accordingly, the pressure-balanced seismic sensor package 100 having an optical accelerometer 106 and an optical hydrophone 119, interferometer optics 552 and splice shuttle 554, can be used for acquiring and outputting four component (4C) and four-dimensional (4D) seismic data.

As illustrated in FIG. 1, the pressure-balanced seismic sensor package 100 can include a plurality of seal screw fittings 114-2 formed in the lid 109 to match with the insertion pathways 114-1, for example, as shown in the upper left and right corners of the sensor box 101. In some embodiments, after the lid 109 is attached to the sensor box 101, a mineral oil can be inserted through at least one of the plurality of seal screw fittings to fill free space in the sensor box 101 around the components therein, such as the plurality of optical components. As used herein, "free space" refers to at least a portion of an interior volume that is not otherwise occupied by structure or apparatus, but may otherwise be occupied by gas or fluid. Free space may also sometimes be referred to as "interstitial space".

The mineral oil can have a temperature variant viscosity sufficient to mechanically constrain the plurality of optical components at an intended operating temperature, such as 0-10 degrees Celsius, which may be found near a seafloor. That is, the mineral oil can have a notably higher viscosity at the intended operating temperature. It can have a lower viscosity that facilitates filling the free space of the sensor box 101 through the seal screw fittings 114-2 at a higher temperature, for example, during manufacture of the pressure-balanced seismic sensor package 100. As such, the mineral oil can be solid enough to mechanically constrain the optical components that it surrounds while being soft enough to behave as liquid with respect to pressure balancing, as described herein. The mineral oil can, for example, be an International Organization for Standardization (ISO) food grade mineral oil, although embodiments are not so limited.

In various embodiments, a sensor box 101 to be filled with mineral oil, as just described, can be formed with a single compartment or first and second compartments to house the optical components described herein. Air can be chased out of such compartments via the mineral oil being added into one seal screw fitting 114-2 and leaving another seal screw fitting 114-2 open, following which seal screws, as shown at 446 in FIG. 4, can be fitted to complete a pressure-tolerant seal of the sensor box 101.

Figure 2B:
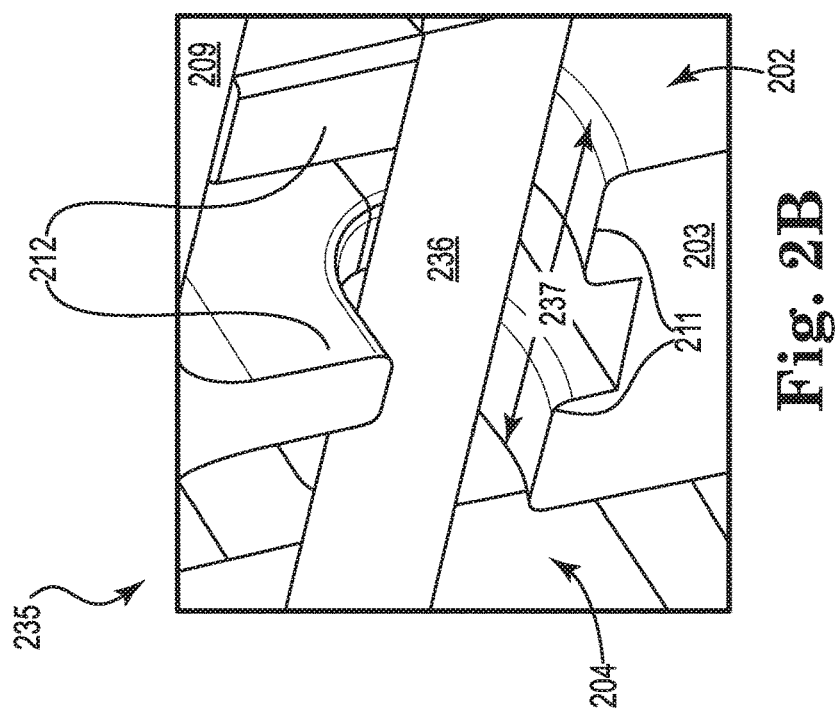
FIG. 2B illustrates an enlarged cross-section view of an example of a portion of a tongue-and-groove-arrangement according to one or more embodiments of the present disclosure.
Figure 2A:
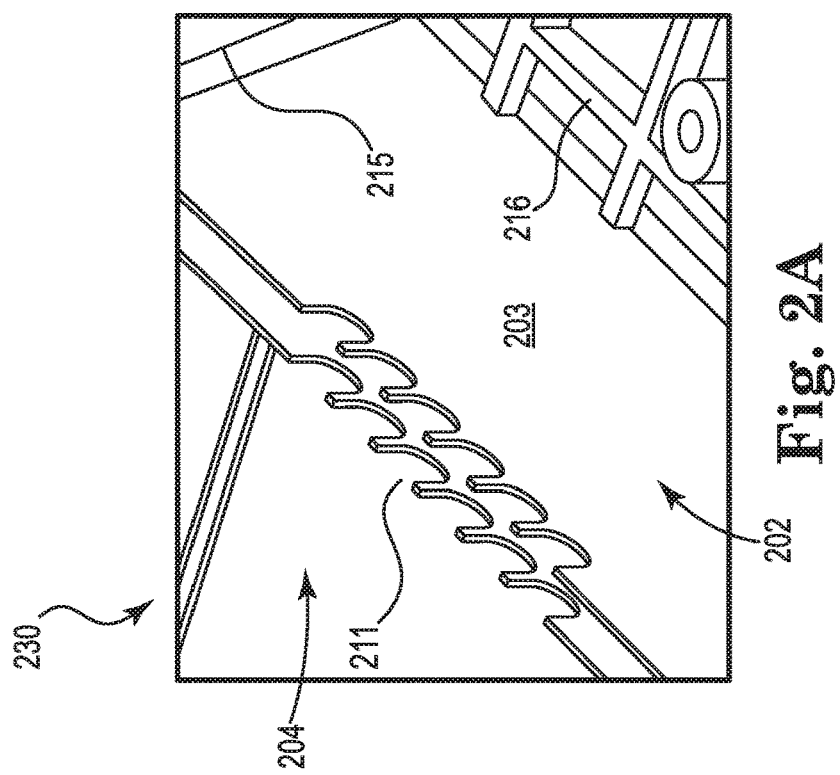
FIG. 2A illustrates cross-section view of an example of a portion of a tongue-and-groove-arrangement according to one or more embodiments of the present disclosure.

FIG. 2A illustrates a cross-section view of an example of a portion of a tongue-and-groove-arrangement according to one or more embodiments of the present disclosure. The cross-section view illustrated at 230 shows that the first compartment 102 and the second compartment 104 of the sensor box 101, as shown in FIG. 1, can be separated by a dividing wall 203 that can include a first tongue- and groove arrangement 211, in various configurations, on the upper edge of the dividing wall 203. The dividing wall 203 can be integrated with raised and/or indented support structures, such as ribs, grids, grooves, etc., on the wall 215 and/or floor 216 of the sensor box 101 to stabilize the position of the dividing wall 203.

FIG. 2B illustrates an enlarged cross-section view of an example of a portion of a tongue-and-groove-arrangement according to one or more embodiments of the present disclosure. The cross-section view illustrated of FIG. 2B at 235 shows that a first tongue-and-groove arrangement 211 on the upper edge of the dividing wall 203 can have a width that can be configured in various embodiments. For example, each side of the width of the first tongue-and-groove arrangement 211 can be separated by a groove. A second tongue-and-groove arrangement 212 on a bottom surface of the lid 209 can be configured to match with the first tongue-and-groove arrangement 211 on the upper edge of the dividing wall 203 when the lid 209 is attached to the sensor box 101. As described further herein, the matched tongue-and-groove arrangement 211, 212 can be configured to provide openings 237 through which optical fibers 236 can pass between the first compartment 102 and the second compartment 104. For example, optical fibers connected to the optical accelerometer 106 in the first compartment 102 shown in FIG. 1 can pass through such openings 237 into the second compartment 104, as described further herein.

To provide a pressure-tolerant seal between the first compartment 102 and the second compartment 104, a sealing compound can be inserted to fill residual space in the opening 237 not occupied by the optical fiber 236 and/or can be used around edges of the dividing wall 203 that contact the wall 215 and floor 216 of the sensor box 101. Examples of such a sealing compound can include marine grade silicon, although embodiments are not so limited.

Figure 3:
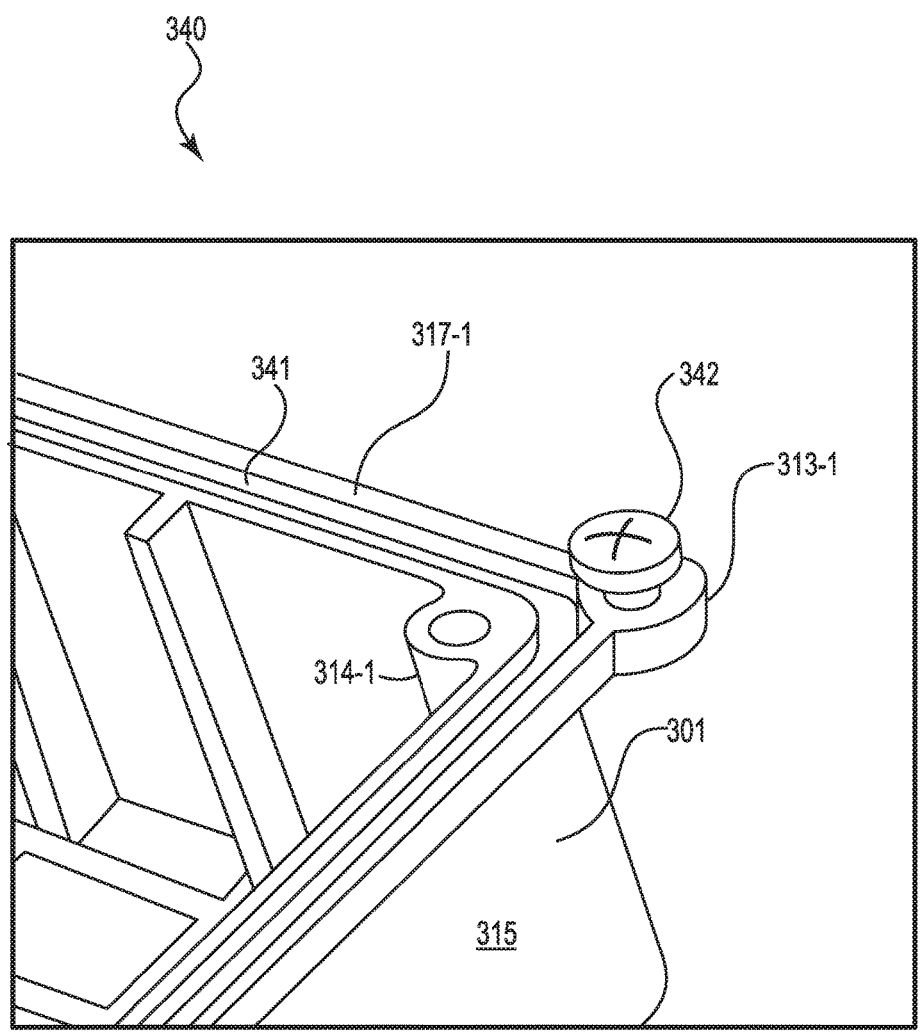
FIG. 3 illustrates a perspective view of an example of a portion of a sensor box according to one or more embodiments of the present disclosure.

FIG. 3 illustrates a perspective view 340 of an example of a portion of a sensor box 301 according to one or more embodiments of the present disclosure. The portion of the sensor box 301 illustrated in FIG. 3 shows that a corner, in some embodiments, can have an interior surface of a wall 315 that can have insertion pathways 314-1 formed thereon, as described with regard to FIG. 1. Among other possible locations, screw fastener fittings 313-1 can be formed at the corner along an exterior of the upper surface 317-1 distal from the interior of the sensor box 301, as described with regard to FIG. 1. For each screw fastener fitting 313-1, a screw fastener 342 can be used to secure and seal the lid, as shown at 109 in FIG. 1, to the sensor box 301. Such a screw fastener 342 can, in some embodiments, be a self-tapping screw fastener and/or a thread-forming screw, although embodiments are not so limited.

In some embodiments, the upper surface 317-1 of the wall 315 of the sensor box 301 can include a groove 341 formed in the upper surface 317-1 that runs around a perimeter of the sensor box 301. In various embodiments, the groove 341 can be formed in the upper edge of the dividing wall 203 and/or the first tongue-and-groove arrangement 211 and/or the second tongue-and-groove arrangement 212 on a bottom surface of the lid 209, as shown in FIG. 2. Prior to assembly, this groove 341 can be filled with a suitable sealing compound such that, when the lid 209 is secured, both the first compartment 102 and the second compartment 104 are sealed from the outside environment and also from one another. Examples of such a sealing compound can include marine grade silicon, although embodiments are not so limited.

Figure 4:
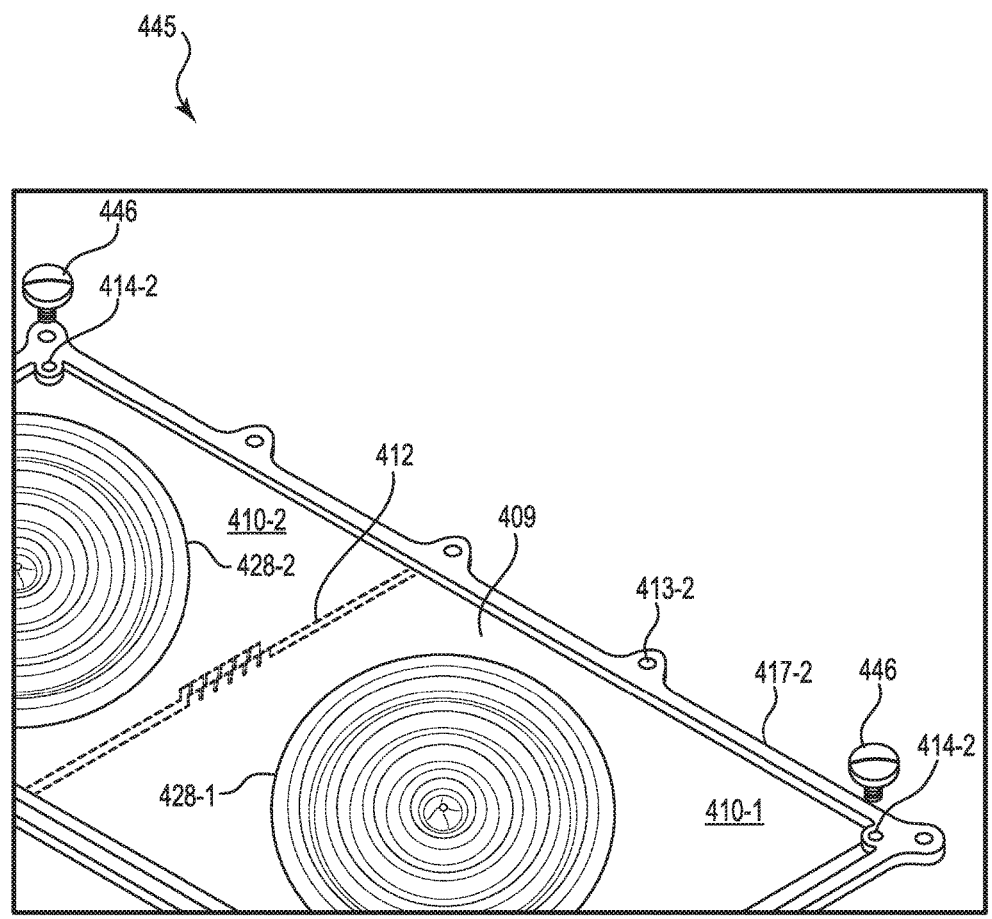
FIG. 4 illustrates a perspective view of an example of a portion of a lid for a sensor box according to one or more embodiments of the present disclosure.

FIG. 4 illustrates a perspective view 445 of an example of a portion of a lid 409 for a sensor box according to one or more embodiments of the present disclosure. The lid 409 illustrated in FIG. 4 shows a second tongue-and-groove arrangement 412 on a bottom surface configured to match with the first tongue-and-groove arrangement 211 on the upper edge of the dividing wall 203 shown in FIG. 2 when the lid 409 is attached to the sensor box 301 shown in FIG. 3. In some embodiments, the lid 409 can have ribs or other support structures (not shown) on the outside and/or inside of portions thereof to impart rigidity, although the lid 409 is designed to be more flexible than the wall 215 and/or floor 216 of the sensor box 301. For example, in some embodiments, the lid 409 can include a first flexible component 428-1 that is formed in a first portion 410-1 of the lid 409 over the first compartment 102 and a second flexible component 428-2 that is formed in a second portion 410-2 of the lid 409 over the second compartment 104 to contribute to the pressure-balance of the sensor box 301 by an alteration of a shape of at least one (potentially both) of the flexible components 428-1, 428-2 in response to a change in an external pressure.

Accordingly, the alteration of the shape of the flexible component can enable an alteration of a volume enclosed by the sensor box 301 and the lid 409 in response to the change in the external pressure. That is, each flexible component can, in some embodiments, undergo a progressive alteration of its shape, such as progressively flexing, in response to a progressive change in water pressure caused by changes in depth and/or seismic events, among other causes.

The lid 409 can, in various embodiments, be formed to include a lower surface 417-2 configured to match the shape of the corresponding upper surface 317-1 of the wall of the sensor box 301. The lower surface 417-2 can be formed to include screw fastener fittings 413-2 configured to match the position of the corresponding screw fastener fittings 313-1 along the wall of the sensor box 301. In addition, the rim 417-2 can be formed to include seal screw fittings 414-2 configured to match the position of the corresponding insertion pathways 314-1 positioned, in some embodiments, in corners of the sensor box 301. Seal screws 446 are shown in association with the seal screw fittings 414-2. The seal screws 446 can be screwed into the seal screw fittings 414-2 to seal the seal screw fittings 414-2 and the hollow core of the insertion pathways 314-1 after the fluidic materials, as described herein, have been inserted into the first compartment 102 and/or the second compartment 104.

Figure 5:
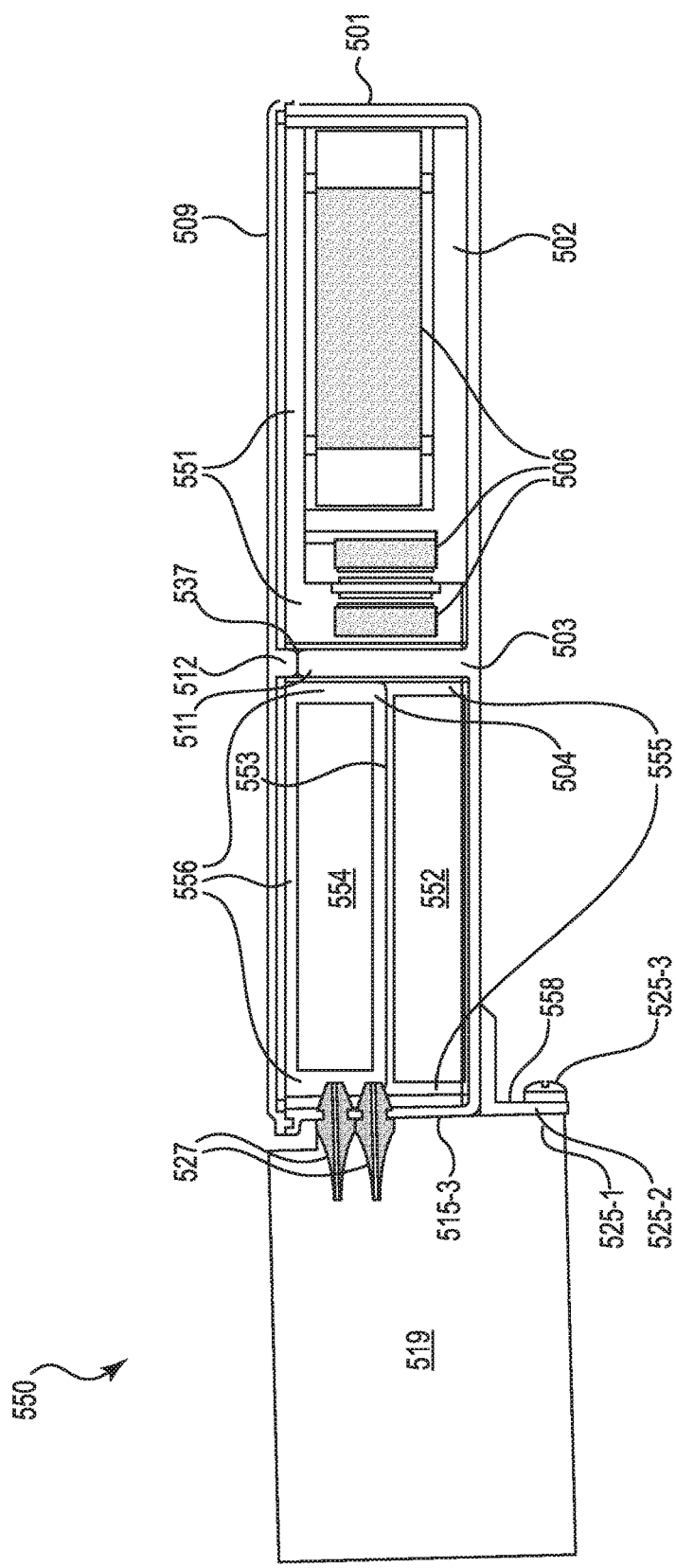
FIG. 5 illustrates a side cross-section view of an example of a portion of a pressure-balanced seismic sensor package according to one or more embodiments of the present disclosure.

FIG. 5 illustrates a side cross-section view 550 of an example of a portion of a pressure-balanced seismic sensor package according to one or more embodiments of the present disclosure. In contrast to the exploded view illustrated in FIG. 1 of an example of a pressure-balanced seismic sensor package 100, FIG. 5 shows a side cross-section view 550 of the structural elements thereof joined together into an integrated package with side views of optical components appropriately positioned for operation.

Accordingly, a sensor box 501 has a first compartment 502 in which an optical accelerometer 506 is housed. In some embodiments, optical accelerometer 506 is a three-axis optical accelerometer using optical fibers, as shown at 236 of FIG. 2, to input or output optical signals, although the optical accelerometer 506 can be configured with other optical components to contribute to the electrically passive operation of the optical accelerometer 506. A free space 551 of the first compartment 502 of the sensor box 501 surrounding the optical accelerometer 506 may be filled with a fluid, such as mineral oil as described herein.

A dividing wall 503 can contribute to sealable separation of the first compartment 502 from a second compartment 504. As shown in FIG. 5, the second compartment 504 can, in some embodiments, be formed to include a lower sub-compartment 555 between the optical accelerometer 506 and the optical hydrophone 519 to house interferometer optics 552 therein for each of the 4C seismic sensors in the pressure-balanced seismic sensor package. That is, interferometer circuits of the interferometer optics 552 can be devoted to each of the signal outputs from the three-axis optical accelerometer 506 and the optical hydrophone 519 seismic sensors. As such, in some embodiments, there can be four Michelson interferometers, each of which is coupled to one of the 4C and/or 4D seismic sensors.

In some embodiments, free space of the lower sub-compartment 555 can be filled with a hard encapsulant. A high glass transition temperature epoxy that is filled with hard particles such as metal, glass, slate, and/or zinc oxide can be used for such a hard encapsulant, although embodiments are not so limited. As such, the interferometer optics 552 can be pressure-tolerantly sealed within the hard encapsulant so as to form a boundary 553 between the lower sub-compartment 555 and an upper sub-compartment 556 of the second compartment 504. Preformed input optical fibers and output optical fibers (not shown) connected to the interferometer optics 552 can exit the top of the hard encapsulant such that they may be spliced in the upper sub-compartment 556 to an optical splice shuttle 554.

Accordingly, the second compartment 504 can include a lower sub-compartment 555 for the interferometer optics 552 that is separated, via the boundary 553, from an upper sub-compartment 556 for the optical splice shuttle 554. The second compartment 504 can include optical fibers that output optical signals, which can contain seismic data, from the interferometer optics 552, where the optical fibers can exit the lower sub-compartment 555 to connect with the optical splice shuttle 554 in the upper sub-compartment 556.

The second compartment 504 can, in some embodiments, be formed to further include the upper sub-compartment 556 to house the optical splice shuttle 554 therein to serve as a junction for splicing optical fibers interconnecting the optical accelerometer 506, the optical hydrophone 519, seismic sensors, and/or the interferometer optics 552. The optical splice shuttle 554 also can serve as a junction for splicing input optical fibers and/or output optical fibers that exit the sensor box 501 via flexible boot seals 527. In some embodiments, the optical fibers that exit the sensor box 501 via the flexible boot seals 527 can be tight buffered optical fibers, as described further herein. As such, the optical splice shuttle 554 can provide a substrate upon which the optical fiber splices are performed and retained and/or can provide a resource for excess optical fiber that may be used to facilitate interconnections between the seismic sensors and other optical components, and/or for tight buffered optical fibers that exit the sensor box 501 to the outside environment via the flexible boot seals 527.

Accordingly, the optical splice shuttle 554 can, in various embodiments, be configured to input first optical signals via first optical fibers from the first part of the pressure-balanced seismic sensor package, which can enclose a plurality of optical components such as the optical accelerometer 506, the interferometer optics 552, and/or the optical splice shuttle 554, and the second part of the pressure-balanced seismic sensor package, which can be the optical hydrophone 519. The optical splice shuttle 554 can, in various embodiments, be configured to output second optical signals via second optical fibers spliced to an optical cable, such as the optical cable 977 shown and described further with regard to FIG. 9A. In various embodiments, the first and second optical signals can include seismic data.

As used herein, tight buffered optical fibers (not shown) can be formed with a tight buffer material disposed around an outside surface of each optical fiber. A layer of the tight buffer material can adhere in a fashion that resists separation from the outer surface of the optical fiber in the presence of water. As such, the optical fibers can be referred to as tight buffered optical fibers.

At least a part of the free space of the upper sub-compartment 556 can be filled with a thermally-reversible thermoplastic gel. The thermally-reversible thermoplastic gel can, in some embodiments, be a highly extended thermally-reversible thermoplastic formed from a styrene block copolymer blended with a mineral oil. The mineral oil can, for example, be an ISO food grade mineral oil, although embodiments are not so limited. The thermally-reversible thermoplastic gel can be a viscous fluid rather than an elastic solid in some instances. As such, the thermally-reversible thermoplastic gel can be solid enough to mechanically constrain the optical fibers that it encapsulates while being soft enough to behave as liquid with respect to pressure balancing.

In manufacture, an unfilled sensor box 501 can be heated in an oven without a lid 509. A fluid can be introduced into the free space. For example, heated thermally-reversible thermoplastic gel can be introduced into the upper sub-compartment 556 around the optical fibers of the optical splice shuttle 554 to a level that can result in full coverage of the optical fibers. The sensor box 501 can be returned to the oven to be autoclaved and/or vacuumed to reduce bubble content in the thermally-reversible thermoplastic gel, following which the sensor box 501 can be removed and allowed to cool. Because the thermoplastic gel is thermally-reversible, it can be removed from the sensor box 501 for servicing and/or repair as desired.

The optical hydrophone 519 can be mechanically connected, at least partially, to an exterior of a wall 515-3 of the sensor box 501 as previously described. The optical interface 120 shown in FIG. 1 can use optical fibers, in various embodiments, to output optical signals, which can contain seismic data, from the optical hydrophone 519. The optical fibers (not shown) can transit through a port, as shown at 121 in FIG. 1, in the wall 515-3 of the sensor box 501 to connect with the optical splice shuttle 554, where the port 121 can be otherwise sealed from the exterior of the wall 515-3 of the sensor box 501.

FIG. 5 shows a flange 558 extending from a bottom of the sensor box 501. The flange 558 can, in some embodiments, extend coplanar with the wall 515-3 of the sensor box 501 in order to match a plane of an end wall 126, as shown in FIG. 1, of the optical hydrophone 519. In various embodiments, one or more screw fasteners 525-3 can each penetrate through a respective hole 525-2 formed in the flange 558 to further penetrate into one or more screw fastener fittings 525-1 in the optical hydrophone 519, such as shown at 125-1 in FIG. 1, to further contribute to the mechanical connection of the optical hydrophone 519 to the sensor box 501. The screw fasteners 525-3 can, for example, be nickel-plated self-tapping screw fasteners, although embodiments are not so limited.

The lid 509 can be secured to the top of the sensor box 501 using the screw fastener fittings 313-1 and screw fasteners 342 described with regard to FIG. 3, along with a suitable sealing compound in the groove 341, such that the lid 509 and an upper surface of the wall of the sensor box 501 form a pressure-tolerant sealed interface. In addition, a second tongue-and-groove arrangement 512 on the bottom surface of the lid 509 can be configured to match with a first tongue-and-groove arrangement 511 on the upper edge of the dividing wall 503 when the lid 509 is attached to the sensor box 501 to contribute to a pressure-tolerant seal between the first compartment 502 and the second compartment 504. To complete a pressure-tolerant seal between the first compartment 502 and the second compartment 504, a sealing compound can be inserted to fill residual space in the opening 537 not occupied by an optical fiber, as shown at 236 in FIG. 2.

Free space around the optical accelerometer 506 can, in some embodiments, be filled with a mineral oil via a seal screw fitting 414-2 that is formed in the lid 509 and an insertion pathway 314-1 that continues into the sensor box 501. The mineral oil can, for example, be an ISO food grade mineral oil, although embodiments are not so limited. Remaining space in the upper sub-compartment 556 not already filled with the thermally-reversible thermoplastic gel can also be filled with mineral oil via a seal screw fitting 414-2 that is formed in the lid 509 and an insertion pathway 314-1 that continues into the sensor box 501. Air can be chased out of the first compartment 502 and second compartments 504 via the mineral oil being added into one seal screw fitting 414-2 and leaving another seal screw fitting 414-2 open, following which seal screws 446 can be fitted to complete the pressure-tolerant seal of the sensor box 501. Over time, the additional mineral oil added to the thermally-reversible thermoplastic gel-filled upper sub-compartment 556 can dissolve into the thermally-reversible thermoplastic gel, resulting in a slightly softer, homogeneous thermally-reversible thermoplastic gel fill.

Figure 6:
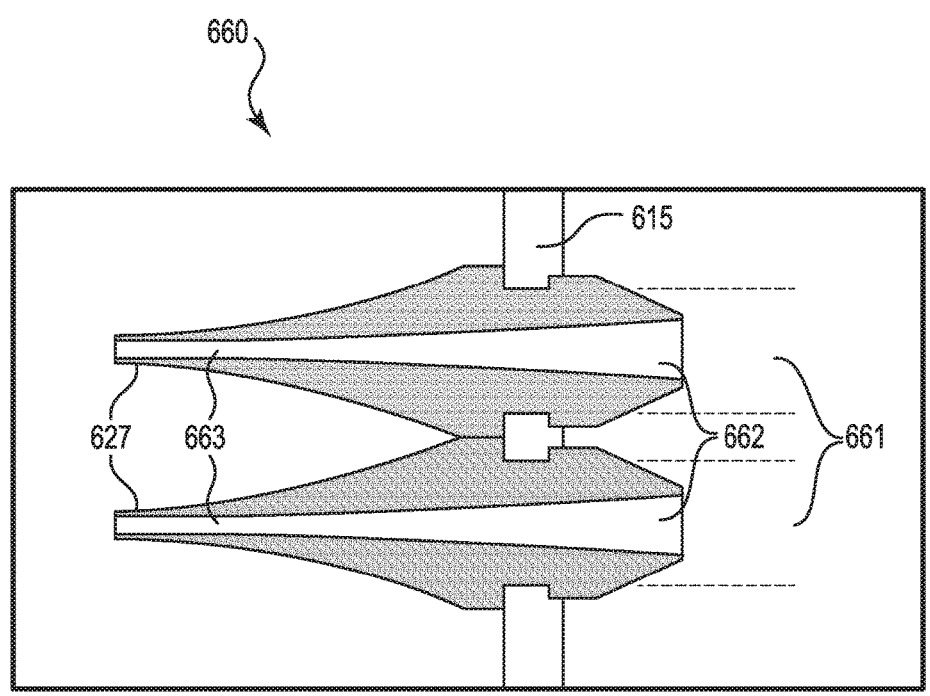
FIG. 6 illustrates a cross-section view of an example of flexible boot seals in a wall of a sensor box according to one or more embodiments of the present disclosure.

FIG. 6 illustrates a cross-section view 660 of an example of flexible boot seals 627 in a wall 615 of a sensor box according to one or more embodiments of the present disclosure. The flexible boot seals 627 can, in various embodiments, each include a tapered hollow inner profile such that a tight buffered optical fiber (not shown) can exit and/or enter through the wall 615 by passing through one of the flexible boot seals 627. A larger diameter 662 of the taper can be included in a portion of the flexible boot seals 627 associated with an interior surface of the wall 615, for example, to facilitate insertion of the tight buffered optical fiber therein. A smaller diameter 663 of the taper can be sized to meet a desired tensile circumferential stress such that the smaller diameter 663 facilitates a seal around an outside diameter of an exiting and/or entering tight buffered optical fiber.

The flexible boot seals 627 can be configured to contribute to an interference fit when inserted into holes 661 in the wall 615 of the sensor box. The configurations of the flexible boot seals 627, the holes 661, and the wall 615 can each be adjusted to provide a collective interference fit to facilitate a seal around a circumference of each of the flexible boot seals 627. In some embodiments, the flexible boot seals 627 can be fabricated from a fluoroelastomer that has an extended operable life-span in direct contact with water, for instance, for 30 years. In some embodiments, the flexible boot seals 627 can be fabricated from a material such as Dupont's Viton®, although embodiments are not so limited. The flexible boot seals 627 can be positioned adjacent to the optical hydrophone 119, 519, and 919 on the outside of the wall 615, as shown in FIGS. 1, 5, and 9B, respectively, and adjacent to the optical splice shuttle 554 in the upper sub-compartment 556 on the inside of the wall 515-3, as shown in FIG. 5, although embodiments are not so limited.

Figure 7:
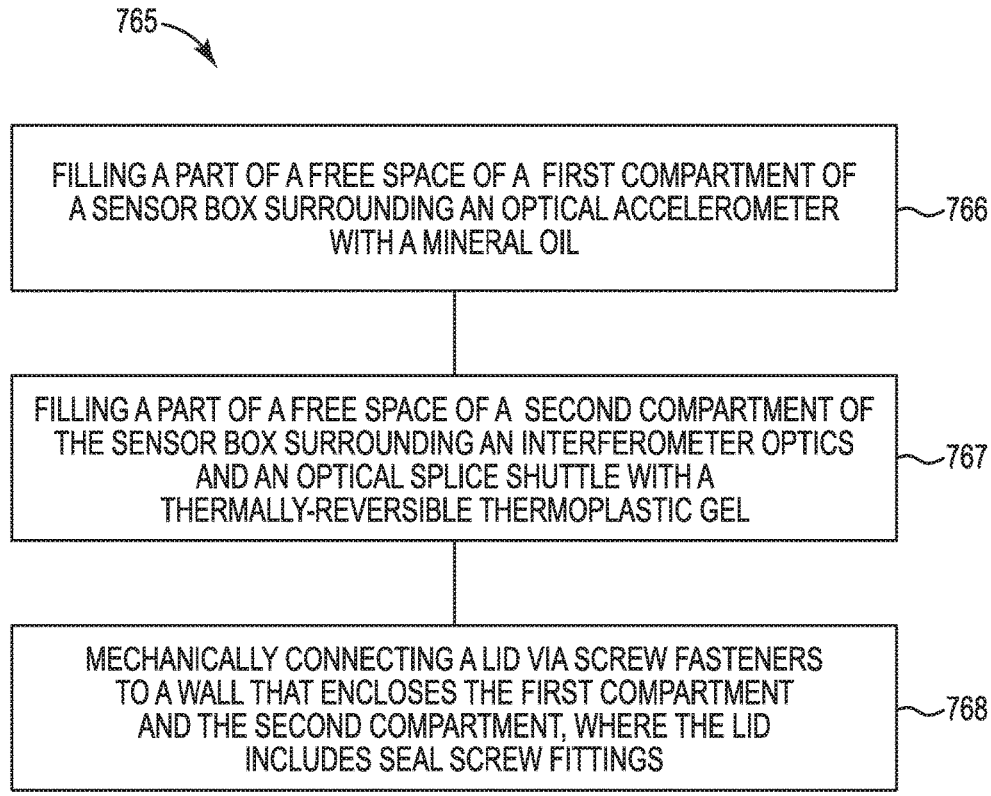
FIG. 7 illustrates a method flow diagram for forming a pressure-balanced seismic sensor package according to one or more embodiments of the present disclosure.

The present disclosure can enable a number of methods of forming, combining components for, using, and/or implementing a pressure-balanced seismic sensor package. For example, FIG. 7 illustrates a method flow diagram 765 for forming a pressure-balanced seismic sensor package according to one or more embodiments of the present disclosure. As shown at block 766 of the flow diagram 765, the method can include filling a part of a free space of a first compartment of a sensor box surrounding an optical accelerometer with a mineral oil. At block 767, the method can include filling a part of a free space of a second compartment of the sensor box surrounding interferometer optics and an optical splice shuttle with a thermally-reversible thermoplastic gel. At block 768, the method can include mechanically connecting a lid via first screw fasteners to a wall that encloses the first compartment and the second compartment, where the lid includes seal screw fittings.

In various embodiments, the method can include prior to mechanically connecting the lid, filling a free space of a lower sub-compartment of the second compartment surrounding the interferometer optics with a hard encapsulant and filling at least a part of a free space of an upper sub-compartment of the second compartment surrounding the optical splice shuttle with the thermally-reversible thermoplastic gel. The free space of the lower sub-compartment surrounding the interferometer optics can, in some embodiments, be filled with the hard encapsulant, as described herein, prior to filling at least the part of the free space of the upper sub-compartment surrounding the optical splice shuttle with the thermally-reversible thermoplastic gel, as described herein. The method can include filling a remainder of the free space of the first compartment and a remainder of the free space of the second compartment through the seal screw fittings with the mineral oil and sealing the first compartment and the second compartment of the sensor box with seal screws in the seal screw fittings.

In various embodiments, the method can include mechanically connecting an optical hydrophone to an exterior of a wall of the second compartment at least in part via a second screw fastener penetrating through a hole in a flange extending from the exterior of the wall and further penetrating into a screw fastener fitting in the optical hydrophone. The method can, in various embodiments, include passing an optical fiber (not shown) connected to the optical splice shuttle through the wall to an exterior of the sensor box via a flexible boot seal, where the flexible boot seal can have a tapered inner profile with a smaller diameter of the taper sized to facilitate a seal around an outside diameter of an exiting optical fiber. The method can, in various embodiments, include forming at least a portion of the lid to flex to correspond to a volume change in at least one of the first compartment and the second compartment, where the portion of the lid is more flexible than the wall and a floor that encloses the first compartment and the second compartment.

Once assembled as described herein, the pressure-balanced seismic sensor package can be suitable for being submerged directly in either fresh or seawater at large depth for long periods of time, for instance, 30 years. The pressure-balanced seismic sensor package can operate at depths of between 500 meters and 1500 meters or more. The lid of the sensor box and/or flexible components formed thereon can be designed to be more flexible than the walls and/or floor of the sensor box itself. Bulk moduli of the mineral oil in the first compartment and the thermally-reversible thermoplastic gel in the second compartment can be substantially similar, as the volumes of the interstitial free spaces that they fill also can be in each of the first compartment and the second compartment of the sensor box. As exterior water pressure increases with depth, the mineral oil in the first compartment and thermally-reversible thermoplastic gel in the second compartment can volumetrically shrink by substantially similar amounts.

Accordingly, the lid and/or the flexible components formed thereon can flex in such a way as to accommodate a reduction in volume in each of the compartments with little measurable resistance. For example, in the embodiments described herein, with approximately 5,000 pounds per square inch (psi) of external pressure (as might be expected at water depths of between 500 meters and 1500 meters or more), an internal pressure of each of the compartments may be approximately 4,998 psi, where an internal pressure of the first compartment may be substantially similar to the internal pressure of the second compartment 504.

The sensor box assembled as such can be termed "pressure-balanced" and can contribute to formation of a pressure-balanced seismic sensor package, as described herein. The pressure-balanced seismic sensor package can be a readily serviceable, modular, pressure-tolerant and/or pressure-balanced, electrically passive optical interferometric 4C unit for use in direct contact with water up to large depths. The 4C pressure-balanced seismic sensor package can include a number of optical components, such as an optical accelerometer, an optical hydrophone, interferometer optics, and/or an optical splice shuttle, as previously described herein. In some instances, the optical components for the pressure-balanced seismic sensor package can be tested as a unit prior to integration therein, with the optical components being removable and/or replaceable based upon test results.

Figure 8:
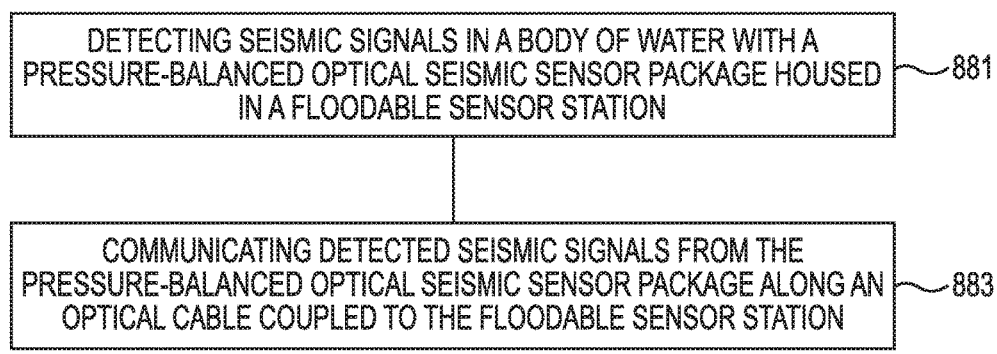
FIG. 8 illustrates a method flow diagram for using a pressure-balanced seismic sensor package according to one or more embodiments of the present disclosure.

FIG. 8 illustrates a method flow diagram for using a pressure-balanced seismic sensor package according to one or more embodiments of the present disclosure. As shown at block 881 the method can include detecting seismic signals in a body of water with a pressure-balanced optical seismic sensor package housed in a floodable sensor station. At block 883, the method can include communicating detected seismic signals from the pressure-balanced optical seismic sensor package along an optical cable coupled to the floodable sensor station.

In at least one embodiment, the method can include communicating detected seismic signals along a floodable optical cable having an interior in fluid communication with the body of water. And, in at least one embodiment, the method can include deploying the pressure-balanced optical seismic sensor package in the body of water to a depth of at least 500 meters and allowing an internal pressure of the pressure-balanced seismic sensor package to become substantially similar to an external pressure thereof.

FIG. 9A illustrates a planar view of an example of a sensor station in which a pressure-balanced seismic sensor package is deployable and operable according to one or more embodiments of the present disclosure. FIG. 9B illustrates an enlarged cross-section view of a middle portion of the example sensor station from FIG. 9A in which a pressure-balanced seismic sensor package is deployable and operable according to one or more embodiments of the present disclosure. FIG. 9B illustrates that the pressure-balanced seismic sensor package 900 can be disposed in an internal cavity 973 of the sensor station 972 shown in FIG. 9A. In some embodiments, the sensor station 972 of FIG. 9A can be utilized for extended-exposure subsea applications, including for PRM with a projected operable subsea life-span of around 30 years. Sensor stations, as described herein, can be modular, readily serviceable, pressure-balanced, and/or pressure-tolerant. Accordingly, as illustrated in FIG. 9A, an embodiment usable for PRM, among other potential implementations, can include a sensor station 972, which can be floodable, attached to an optical cable 977 or between ends of two optical cables 977.

The internal cavity 973 (shown in FIG. 9B) of the sensor station 972 can be floodable, in particular, at or near the seafloor where there is high water pressure. The internal cavity 973 of the sensor station 972 being floodable contributes to the utility of the pressure-balanced seismic sensor package 900 being pressure-balanced, as described herein, in order to be pressure-tolerant. The pressure-balanced seismic sensor package 900 being pressure-balanced and pressure-tolerant can protect walls of a sensor box 901, a lid 909, and/or an optical hydrophone 919 from being crushed. For example, the pressure-balanced seismic sensor package 900 can have a crush load capability of more than 8,000 Newtons when the internal cavity 973 is flooded, although embodiments are not so limited.

The sensor station 972 can include two case halves (one case halve 974-2 shown in the planar view of FIG. 9A, and the interior of the other case halve 974-1 shown in the cross-section view of FIG. 9B) that can be closed around the pressure-balanced seismic sensor package 900 to contribute to forming the internal cavity 973. Each of the two case halves 974-1, 974-2 can close around the pressure-balanced seismic sensor package 900 to create, in some embodiments, a substantially cylindrical exterior and a substantially cylindrical internal cavity 973. The sensor station 972 can include two end portions 978-1, 978-2 of a bending strain relief (BSR) member (bend stiffener) at each distal end of the sensor station 972 with the optical cable 977 passing therethrough. Each of the two end portions 978-1, 978-2 of the BSR member can be mechanically connected to the two case halves 974-1, 974-2. The sensor station 972 can include a middle portion 979 of the BSR member to connect the two end portions 978-1, 978-2. In some embodiments, the middle portion 979 of the BSR member can be configured with an upward curve in the direction of the internal cavity 973, with such a configuration intended to impart to the sensor station 972 more resistance to bending than would otherwise exist.

The internal cavity 973 can be configured with structures 975, such as ribs, bosses, holes, fastener fittings, among others, to facilitate secure mechanical support therein of the pressure-balanced seismic sensor package 900. Such structures 975 can, in various embodiments, be formed on the two end portions 978-1, 978-2 and/or the middle portion 979 of the BSR member and/or either or both of the two case halves 974-1, 974-2, among other possibilities. For example, further mechanical support can be contributed by a cable clamp 976 that also can mechanically connect without adhesive to the optical cable 977 to mechanically support the optical cable 977. Hence, such structures 975 can provide secure mechanical support to a sensor box 901, a lid 909, and/or an optical hydrophone 919 of the pressure-balanced seismic sensor package 900.

In addition, the structures 975 can leave room for, in some embodiments, a first flexible component 928-1 in a portion of the lid 909 over a first compartment 902 and a second flexible component 928-2 in a portion of the lid 909 over a second compartment 904, separated from the first compartment 902 by a dividing wall 903, to contribute to a pressure-balance of the sensor box 901 by an alteration of a shape of at least one flexible component 928-1, 928-2 in response to a change in an external pressure. The structures 975 also can leave room for optical fibers (not shown), such as tight buffed optical fibers, to exit and/or enter flexible boot seals 927. In some embodiments, the pressure-balanced seismic sensor package 900 can be connected to a fiber trunk line (not shown) inside the sensor station 972.

Such optical fibers can be spliced (not shown) to the optical cable 977 to transmit optical signals carrying various types of seismic data to and/or from the optical cable 977. For example, in various embodiments, the optical signals can originate from seismic sensors, such as a three-axis optical accelerometer and/or an optical hydrophone, forming part of the pressure-balanced seismic sensor package 900 as relayed by optical fibers via an optical splice shuttle to the flexible boot seals 927. Such optical signals can be transmitted through the optical cable 977. In some embodiments, the transmitted optical signal can be processed to generate a geophysical data product, as described herein.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
    a first part of a pressure-balanced seismic sensor package comprising a plurality of optical components enclosed in a sensor box;
    a lid for the sensor box that includes at least one flexible component;
    a second part of the pressure-balanced seismic sensor package comprising an optical hydrophone connected to the sensor box; and
    a flexible boot seal that transits through a wall from an interior of the sensor box to the optical hydrophone, wherein the flexible boot seals includes a tapered hollow inner profile.

2. The system of claim 1, wherein the flexible component is formed to contribute to a pressure-balance of the sensor box by an alteration of a shape of the flexible component in response to a change in an external pressure.

3. The system of claim 1, wherein the first part of the pressure-balanced seismic sensor package and the second part of the pressure-balanced seismic sensor package are electrically passive.

4. The system of claim 1, wherein the optical hydrophone is configured not to be pressure-balanced.

5. The system of claim 1, wherein the optical hydrophone is configured to be pressure-balanced.

6. The system of claim 1, wherein a larger diameter of the taper is included in a portion of the flexible boot seal associated with the interior of the sensor box.

7. The system of claim 6, further comprising an optical fiber connected to at least one of the plurality of optical components, wherein the optical fiber exits the sensor box through the flexible boot seal.

8. The system of claim 7, wherein a smaller diameter of the taper is sized to meet a desired tensile circumferential stress such that the smaller diameter facilitates a seal around an outside diameter of the optical fiber.

9. The system of claim 1, wherein the flexible boot seal is configured to contribute to an interference fit with the hole of the wall.

10. The system of claim 9, wherein the flexible boot seal comprises a fluoroelastomer.

11. The system of claim 1, wherein the optical hydrophone is mechanically connected to an exterior of the sensor box.

12. A system, comprising:
a first part of a pressure-balanced seismic sensor package comprising a plurality of optical components enclosed in a sensor box, the sensor box comprising:
a first compartment enclosing an optical accelerometer; and
a second compartment enclosing interferometer optics and an optical splice shuttle, wherein the first compartment and the second compartment are separated by a dividing wall comprising a first tongue-and-groove arrangement on an upper edge of the dividing wall;
a lid for the sensor box that includes at least one flexible component; and
a second part of the pressure-balanced seismic sensor package comprising an optical hydrophone mechanically connected to an exterior of the sensor box.

13. The system of claim 12, wherein:
a first flexible component is formed in a first portion of the lid over the first compartment; and
a second flexible component is formed in a second portion of the lid over the second compartment.

14. The system of claim 13, wherein the lid is removable.

15. The system of claim 12, wherein the optical splice shuttle is configured to:
input first optical signals via first optical fibers from the first part of the pressure-balanced seismic sensor package and the second part of the pressure-balanced seismic sensor package; and
output second optical signals via second optical fibers spliced to an optical cable.

16. The system of claim 12, wherein the second compartment comprises a first sub-compartment for the interferometer optics separated from a second sub-compartment for the optical splice shuttle.

17. The system of claim 16, further comprising:
optical fibers configured to output optical signals from the interferometer optics,
wherein the optical fibers exit the first sub-compartment to connect with the optical splice shuttle in the second sub-compartment.

18. The system of claim 12, wherein the lid comprises a second tongue-and-groove arrangement on a bottom surface configured to match with the first tongue-and-groove arrangement on the upper edge of the dividing wall when the lid is attached to the sensor box.

19. The system of claim 18, further comprising:
optical fibers configured to output optical signals from the optical accelerometer,
wherein the optical fibers pass through the matched tongue-and-groove-arrangement to connect with the optical splice shuttle, and
wherein the matched tongue-and-groove-arrangement is otherwise sealed between the first compartment and the second compartment.

20. The system of claim 12, further comprising:
optical fibers configured to output optical signals from the optical hydrophone,
wherein the optical fibers transit through a port in the wall of the sensor box to connect with the optical splice shuttle, and
wherein the port is otherwise sealed.

21. A system, comprising:
a first part of a pressure-balanced seismic sensor package comprising a plurality of optical components enclosed in a sensor box, the sensor box comprising:
a first compartment enclosing an optical accelerometer; and
a second compartment enclosing interferometer optics and an optical splice shuttle, wherein the optical splice shuttle is configured to:
input first optical signals via first optical fibers from the first part of the pressure-balanced seismic sensor package and the second part of the pressure-balanced seismic sensor package; and
output second optical signals via second optical fibers spliced to an optical cable;
a lid for the sensor box that includes at least one flexible component; and
a second part of the pressure-balanced seismic sensor package comprising an optical hydrophone mechanically connected to an exterior of the sensor box.

22. A system, comprising:
a first part of a pressure-balanced seismic sensor package comprising a plurality of optical components enclosed in a sensor box, the sensor box comprising:
a first compartment enclosing an optical accelerometer; and
a second compartment enclosing interferometer optics and an optical splice shuttle, wherein the second compartment comprises a first sub-compartment for the interferometer optics separated from a second sub-compartment for the optical splice shuttle;
a lid for the sensor box that includes at least one flexible component; and
a second part of the pressure-balanced seismic sensor package comprising an optical hydrophone mechanically connected to an exterior of the sensor box.

23. The system of claim 22, further comprising:
optical fibers configured to output optical signals from the interferometer optics,
wherein the optical fibers exit the first sub-compartment to connect with the optical splice shuttle in the second sub-compartment.

* * * * *